United States Patent
Benz et al.

(10) Patent No.: US 6,408,966 B1
(45) Date of Patent: *Jun. 25, 2002

(54) FUEL CELL VEHICLE

(75) Inventors: Uwe Benz, Uhldingen-Muehlof; Gerald Hornburg, Elchingen; Werner Tillmetz, Wesserburg, all of (DE)

(73) Assignee: Xcellsis GmbH, Kirchheim/Teck-Nabern (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,801

(22) Filed: Jul. 23, 1998

(30) Foreign Application Priority Data

Jul. 23, 1997 (DE) .......................... 197 31 642

(51) Int. Cl.⁷ ................................ H01M 8/18
(52) U.S. Cl. ................. 180/65.1; 180/65.3; 429/13
(58) Field of Search ............... 180/65.1, 165, 180/65.2, 65.3, 65.4, 65.6, 65.7, 65.8; 429/13, 19; 417/313; 416/60; 320/102; 322/13; 318/139

(56) References Cited

U.S. PATENT DOCUMENTS

| 4,084,924 A | * | 4/1978 | Ivanoff et al. ................ 416/60 |
| 4,760,697 A | * | 8/1988 | Heggie et al. ............... 180/165 |
| 4,836,755 A | * | 6/1989 | Nitsche et al. ................ 416/60 |
| 5,228,529 A | * | 7/1993 | Rosner ....................... 180/65.3 |
| 5,346,778 A | | 9/1994 | Ewan et al. |
| 5,631,532 A | * | 5/1997 | Azuma et al. ............... 320/102 |
| 5,678,410 A | | 10/1997 | Fujita et al. |
| 5,808,448 A | * | 9/1998 | Naito .......................... 322/13 |
| 5,823,280 A | * | 10/1998 | Lateur et al. ............... 180/65.2 |
| 5,847,520 A | * | 12/1998 | Theurillat et al. .......... 318/139 |
| 5,925,993 A | * | 7/1999 | Lansberry ................... 180/165 |
| 5,964,309 A | * | 10/1999 | Kimura et al. ............. 180/65.8 |
| 5,991,670 A | * | 11/1999 | Mufford et al. ............ 180/65.1 |

FOREIGN PATENT DOCUMENTS

| DE | 33 45 956 A1 | 6/1984 |
| DE | 41 42 863 A1 | 4/1993 |
| EP | 0 755 088 A2 | 1/1997 |
| WO | WO 96/41393 | 12/1996 |

OTHER PUBLICATIONS

Patent Abstracts of Japan, 06203846, Jul. 22, 1994, Kato Hideo.
Patent Abstracts of Japan, 07099057, Nov. 4, 1995, Fujita Nobuo.
Keith B. Prater, "Solid polymer fuel cell developments at Ballard," *Journal of Power Sources*, 37 (1992), pp. 181–188.

* cited by examiner

*Primary Examiner*—Lanna Mai
*Assistant Examiner*—Hau Phan
(74) *Attorney, Agent, or Firm*—Crowell & Moring LLP

(57) ABSTRACT

A fuel cell vehicle comprises an electric drive system and a fuel cell system for providing electric energy for the drive system. According to the invention, the electric drive system is set up for regenerating braking energy, and devices are provided for the direct utilization of the regenerated braking energy in at least one energy-consuming component of the fuel cell system. This direct braking energy utilization in the fuel cell system increases the degree of energy utilization without the requirement of a separate intermediate energy storage device for the intermediate storing of regenerated braking energy.

12 Claims, 1 Drawing Sheet

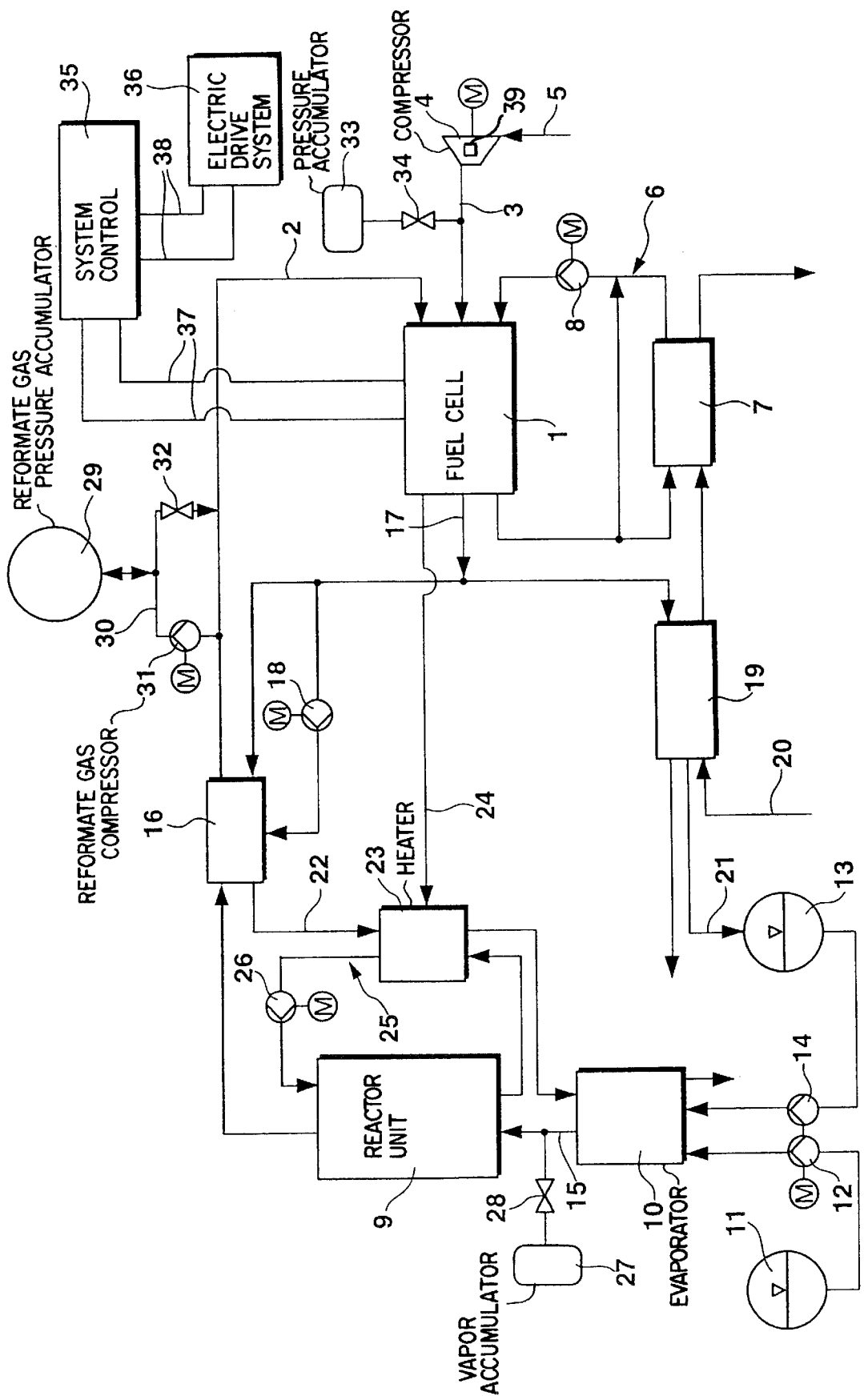

FUEL CELL VEHICLE

BACKGROUND AND SUMMARY OF THE INVENTION

This application claims the priority of German Patent Application No. 197 31 642.5, filed Jul. 23, 1997, the disclosure of which is expressly incorporated by reference herein.

The present invention relates to a fuel cell vehicle, for example, an automobile.

Fuel cell vehicles having an electric drive system and a fuel cell system for providing electric energy for the drive system are generally known. The electric drive system typically has one or more electric motors that convert the electric energy generated by the fuel cell system into driving forces for the vehicle wheels. Frequently, the fuel cell system of known fuel cell vehicles comprises a methanol reforming system by means of which hydrogen for feeding the fuel cells is obtained from methanol carried along in a liquid state so that a large-volume hydrogen storage device is not necessary.

A fuel cell system of this type is described in German Published Patent Application DE 33 45 956 A1. In the system described therein, water electrolysis devices are also provided by means of which, during vehicle operating phases with a low or normal load, a portion of the energy generated by the fuel cell system is used for the electrolysis of water, in which case the hydrogen and oxygen obtained in this manner are stored in a respective pressure accumulator. During vehicle operating phases with a peak load demand, the stored hydrogen and oxygen are then fed to the fuel cells as reaction gases instead of a methanol reformate gas and air, which in the other operating phases are used as reaction gases. As a result, the size of the fuel cell stack can be designed for lower power requirements during the normal operation and can nevertheless meet peak performance demands.

In the case of vehicles having a hybrid drive, it is known to set up the electric drive system for the regenerating of braking energy, for example, an electric machine of the drive system is alternatively used as an electric motor and as a generator. In operating phases in which forces are to be transmitted to the driving wheels, the electric machine operates as a driving electric motor while it operates as a generator in braking phases. Thus, kinetic vehicle energy is reconverted into electric energy. The braking energy regenerated in this manner is intermediately stored in an energy storage device, such as a flywheel storage device or a buffer battery, and is therefore available again as driving energy. A hybrid drive of this type is described in German Published Patent Application DE 41 24 479 A1. It is also known to feed the regenerated braking energy of a hybrid drive system alternatively not into an accumulator but to use it directly for the feeding of electric consuming devices, such as lights, fans or an air conditioner compressor. See German Published Patent Application DE 41 42 863 A1.

A fuel cell vehicle of the initially mentioned type is described in German Published Patent Application WO 96/41393 A1. The fuel cell system described there contains, among other things, a tempering fluid circulation system for regulating the temperature of the fuel cell stack. An electric resistance is situated in the tempering fluid circulating system by means of which the tempering fluid can be heated. The resistance is electrically fed by way of a power supply bus into which the electric energy generated by the fuel cell stack is fed and to which an electric vehicle driving motor is coupled by way of an inverse rectifier. By way of the electric driving motor, which will then operate as a generator, and the inverse rectifier, vehicle braking energy can be fed back into the power supply bus and can be utilized for energizing the resistance and thus for heating the tempering fluid when and if there is a demand for such a tempering fluid heating during a braking phase. In order to permit a heating of the tempering fluid, for example when the vehicle is stationary, it is also possible to connect the power supply bus to an external power supply system. Hydrogen which is obtained, for example, from a reformation reaction can be used as a fuel for the fuel cell stack. For providing the hydrogen, a methanol reforming system can be used, for example, and the oxygen supply of the fuel cells can take place in the form of an oxygen-containing gas that is compressed by means of a compressor. See the journal essay by K. B. Prater, "Solid Polymer Fuel Cell Developments at Ballard", *Journal of Power Sources*, 37 (1992), Page 181.

The present invention is based on the technical problem of providing a fuel cell vehicle that has a comparatively high degree of energy utilization.

In the case of the present fuel cell vehicle, the electric driving system is set up for regenerating the braking energy, and devices are provided by means of which a direct utilization of the regenerated braking energy is implemented in at least one energy-consuming component of the fuel cell system. In this manner, the kinetic vehicle energy during braking operations is not completely lost but can be utilized at least partly in an energy-consuming component of the fuel cell system, which increases the degree of total energy utilization of the vehicle. Since the regenerated braking energy is utilized directly for the fuel cell system, no additional intermediate energy storage device, for example a buffer battery or traction battery, is required, which contributes to the saving of energy and permits a braking energy regenerating without any problem. In addition, it is found that this type of utilization of the regenerated braking energy is clearly simpler and presents fewer problems than a theoretically possible utilization in the form of a reversal of the fuel cell reaction in order to regenerate by means of this reversal reaction hydrogen and oxygen by electrolysis. Because of the materials and catalysts normally used in the fuel cells, this reversal reaction presents problems in practice.

In the case of a vehicle according to a first embodiment of the present invention, regenerated braking energy is utilized specifically for a compressor by means of which oxygen-containing gas, such as air, is compressed for the fuel cells. In this case, the compressor may contain an integrated flywheel storage device that receives the fed braking energy, or a pressure accumulator is provided in which, when regenerated braking energy is fed to the compressor, additional compressed gas is stored intermediately.

In the case of the vehicle according to a second embodiment of the present invention, regenerated braking energy is utilized specifically for the intermediate storage of a hydrogen-containing reformate gas that is supplied by a reforming reactor unit of a methanol reforming system. For this purpose, a compressor provided downstream of the reactor unit is operated by means of regenerated braking energy. The compressor thereby compresses reformate gas which is then intermediately stored in a pressure accumulator provided for this purpose and is available for operating phases with an increased power demand.

In the case of the vehicle according to a third embodiment of the present invention, the regenerated braking energy specifically in a methanol reforming system as part of the fuel cell system, is utilized in that, by means of an evaporator, a water/methanol mixture is evaporated at an excess and the excess water/methanol vapor is intermediately stored in a vapor accumulator which is provided for this purpose and which is arranged between the evaporator and a reforming reactor unit connected behind it.

In the case of a vehicle according to a fourth embodiment of the present invention, regenerated braking energy is fed to a reactor heater and is utilized for additional heating of a reforming reactor unit by means of which methanol is reformed in order to obtain hydrogen for the fuel cells. This additional heating of the reforming reactor unit promotes the conversion of methanol, in which case, as the result of the heat capacity of the reactor unit, an intermediate energy storage effect is achieved.

In the case of a vehicle according to a fifth embodiment of the present invention, regenerated braking energy is utilized for the additional heating of an evaporator of a methanol reforming system by means of which a methanol/water mixture is evaporated before the feeding into a reforming reactor unit.

Other objects, advantages and novel features of the present invention will become apparent from the following detailed description of the invention when considered in conjunction with the accompanying drawings.

BRIEF DESCRIPTION OF THE DRAWING

The single FIGURE is a block diagram of the part of a fuel cell vehicle that has a fuel cell system and an electric driving system coupled thereto construed according to preferred embodiments of the invention.

DETAILED DESCRIPTION OF THE DRAWING

The fuel cell system according to the present invention and illustrated in the FIGURE contains a fuel cell stack 1 to which, on the input side, by way of a reformate gas pipe 2, a high-hydrogen reformate gas can be fed from a water vapor reforming of methanol as well as compressed air can be fed by way an air feeding pipe 3, which air is provided by a compressor 4 while taking in a fresh air flow 5. An oil circulating system 6 with a cooler 7 and a cooling pump 8 is used for cooling the fuel cell stack 1.

The reformate gas is generated in a methanol reforming system which is part of the fuel cell system and, as a core, contains a conventional reforming reactor unit 9. An evaporator 10 is connected in front of the reactor unit 9, to which evaporator 10, on the one hand, liquid methanol is fed from a methanol tank 11 by way of a methanol apportioning pump 12 and, on the other hand, liquid water is fed from a water tank 13 by way of a water apportioning pump 14. While evaporating these components, the evaporator generates a water/methanol vapor mixture which can be fed by way of a mixture feeding pipe 15 into the reactor unit 9. The reformate gas emerging from the reactor unit 9, which may contain a fraction of carbon monoxide which is harmful to the fuel cells, is fed to a CO-oxidation stage 16 which exothermally oxidizes the carbon monoxide to carbon dioxide. For providing the oxygen required for this purpose, a first portion of the cathode exhaust gas flow 17 is fed from the fuel cell stack 1 into the CO oxidation stage 16, in which case an apportioning pump 18 is provided for controlling the quantity. A second portion of the cathode exhaust gas flow 17 is guided as a heat transfer medium through the CO oxidation stage 16 and absorbs the oxidation heat, for the purpose of which the CO oxidation stage 16 has a suitable heat transfer construction. A third portion of the cathode exhaust gas flow 17 is guided by way of a condenser 19 which, on the other side, is acted upon by a cooling air flow 20 which is subsequently also used as a cooling medium for the cooler 7. The water contained in the fed cathode exhaust gas condenses in the condenser 19 and is then returned by way of a condensate pipe 21 into the water tank 12. The cathode exhaust gas cooled in the condenser 19 is emitted as outgoing air.

The portion of the cathode exhaust gas heated in the CC oxidation stage 16 by the oxidation heat is fed by way of a cathode exhaust gas feed pipe 22 to a catalytic heater 23 to which, on the other side, by way of an anode exhaust gas feed pipe 24, the anode exhaust gas flow from the fuel cell stack 1 is fed. Under the effect of a suitable catalyst material, a catalytic combustion process of the anode exhaust gas component with the cathode exhaust gas component heated on the CO oxidation stage 16 is carried out in the catalytic heater 23. The heater 23 has a heat transfer structure and forms part of an oil heating circulation system 25 for heating the reforming reactor unit 9. For this purpose, the oil is heated in the heater 23 by the combustion heat of the catalytic combustion process and is fed by means of a circulation pump 26 to the reforming reactor unit 9 in order to heat this unit to a temperature suitable for carrying out the reforming reaction. For this purpose, the reactor unit 9 also contains in a conventional manner a heat transfer structure in the case of which one or several heat ducts through which the heating oil flows are separated by heat-conducting walls from a one-part or multi-part reaction space filled with suitable catalyst material. The cooled heating oil emerging from the reactor unit 9 will then circulate back into the heater 23. The hot combustion gas emerging from the catalytic heater 23 is guided as a heating medium through the evaporator 10 where it emits the heat required for evaporating the liquid water/methanol mixture before it is emitted to the outside as outgoing air. For this purpose, the evaporator 10 again has a heat transfer structure with separate flow ducts, which are in a thermal contact, for the hot combustion gas, on the one hand, and the water/methanol mixture, on the other hand.

Additional components of the fuel cell system are used in particular for the direct braking energy regenerating. Thus a water/methanol vapor accumulator 27 is provided which is coupled to the mixture feeding pipe 15 between the evaporator 10 and the reactor unit 9 by way of a activatable valve 28, in which water/methanol vapor accumulator 27 excess water/methanol vapor can be intermediately stored. Analogously, the reformate gas emerging from the Co oxidation stage 16 and consisting essentially of hydrogen as well as of a small portion of carbon dioxide can be intermediately stored in a compressed form in a reformate gas pressure accumulator 29 which, by way of a branch-off pipe 30, is connected to the reformate gas pipe 2. Ln the branch-off pipe 30, a compressor 31 is situated on the feed side for compressing reformate gas which is to be intermediately stored and, on the outflow side, an activatable valve 32 is situated by way of which the intermediately stored, compressed reformate gas can be fed back from the pressure accumulator 29 in an apportioned manner into the reformate gas pipe 2. In addition, the possibility exists for an intermediate storing of compressed air in front of the inlet side of the fuel cell stack 1, for the purpose of which a corresponding compressed-air accumulator 33 is connected by way of an activatable valve 34 to the air feed pipe 3 leading from the fresh-air compressor 4 to the fuel cell stack 1. In addition or as an alternative to this compressed-air intermediate storage, the fresh-air compressor may contain an integrated flywheel storage device 39 for the intermediate storage of energy.

The fuel cell system is controlled by a central system control 35, in which case only the control measures will be discussed in the following which are relevant in connection with the braking energy regenerating implemented in the case of the present vehicle, while otherwise the control takes place in a conventional manner. For reasons of clarity, the pertaining control lines are also omitted. In particular, the system control 35 also serves as an interface between the fuel cell stack 1 and a conventional electric drive system 36 which has one or several electric motors acting upon the driving wheel of the vehicle. During active operating phases, the electric drive motors are fed by the electric energy which is generated by the fuel cell stack 1 and which, by way of corresponding electric connection lines 37, 38, is fed from the fuel cell stack 1 to the system control 35 and from there to the electric drive system 36.

The operating mode of the vehicle during the braking phases is now characteristic in which kinetic vehicle energy is regenerated and is utilized directly in one or several energy-consuming components of the fuel cell system. For this purpose, the electric drive system 36 is set up for the regenerating of braking energy, as known, for example, from hybrid drives. Specifically, this can be implemented in that an electric machine is used as an electric driving motor which, during braking phases, operates as a generator and in this manner, by way of the corresponding connection line 38, feeds back electric energy into the system control 35. The system control 35 supplies the fed-back braking energy directly to certain energy-consuming components of the fuel cell system without the requirement of intermediately storing this energy in a separate buffer battery or the like. Several possibilities exist in the present fuel cell system for this direct utilization of regenerated braking energy, one or several of which can be used respectively by the system control 35 depending on the system condition.

A first possibility consists of heating the reforming reactor unit 9 additionally with regenerated braking energy and, as a result, raising its temperature for carrying out the endothermal methanol reforming reaction, that is, from approximately 250° C. to approximately 300° C. This can take place, for example, by way of a direct electric heating of the reactor unit 9 which is not illustrated or in that the system control 35 operates an electric heating element assigned to the oil heating circulation system 25 as well as the circulation pump 26 by means of the regenerated braking energy. As the result of the heat capacity of the reactor unit 9, this reactor unit 9 can directly absorb the fed, regenerated braking energy, the raised reactor temperature promoting the conversion of methanol. When the oil heating circulation system 25 is heated, the heating oil, in addition, has the effect of a thermal intermediate storage medium.

A second possibility consists of the fact that the system control 35 carries out an additional heating of the evaporator 10 by means of regenerated braking energy, for the purpose of which, for example, an additional electric heater may be provided on the evaporator 10. As an alternative, an oil heating circulation system may be provided for the additional heating of the evaporator, in which case the heat capacity of the oil heating circulation system, in addition to that of the evaporator 10, acts as a thermal intermediate storage device. The heating of the evaporator 10 can take place, for example, from approximately 200° C. to approximately 250° C.

According to a third utilization possibility, the system control 35 causes the evaporating at an excess of the water/methanol mixture fed to the evaporator 10 and the storage of the excessively provided water/methanol vapor in the water/methanol vapor storage device 27. By means of the corresponding activating of the pertaining valve 28, after the concluded braking operation, the intermediately stored vapor can then successively be introduced into the reactor unit 9.

A fourth utilization possibility of the regenerated braking energy in the fuel cell system consists of the fact that the system control 35 operates the fresh-air compressor 4 by means of regenerated braking energy and intermediately stores the compressed air additionally provided in this manner under a high pressure in the compressed-air storage device 33. This air can then be introduced after a concluded braking operation successively by the corresponding activating of the pertaining valve 34 into the fuel cell stack 1. If the compressor 4 has an integrated flywheel storage device, it is capable of additionally or alternatively absorbing the braking energy supplied to the compressor for generating additional compressed air.

A fifth utilization possibility for regenerated braking energy in the fuel cell system consists of the fact that the system control 35 operates the reformate gas compressor 31 by means of regenerated braking energy, whereby compressed reformate gas, which essentially consists of hydrogen, is intermediately stored at an increased pressure in the reformate gas pressure accumulator 29. This reformate gas can then, after the concluded braking operation, be successively fed back into the reformate gas pipe 2 and thus into the fuel cell stack 1.

The above description of an advantageous example of the invention demonstrates that, in the case of the fuel cell vehicle according to the present invention, by means of the direct utilization of regenerated braking energy in the fuel cell system, a high degree of energy utilization is achieved. Depending on the situation, of the five above-explained utilization possibilities, one possibility or an arbitrary combination of possibilities can be used. In addition, regenerated braking energy can naturally also be fed in a different manner to one or several energy consuming components of the respective fuel cell system for a direct utilization. In addition, instead of the described regenerating of braking energy in the form of electric energy, it is conceivable to carry out such a regenerating of braking energy in the form of thermal energy occurring during the braking, which thermal energy can then be utilized directly in a heat-absorbing component of the fuel cell system.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell vehicle, comprising:
   an electric drive system having at least one electric motor and being adapted for regenerating braking energy, said electric drive system being connected to a system control;
   a fuel cell system comprising a fuel cell stack for providing electric energy to the electric drive system and connected to the control system by electric connection lines;
   a compressor coupled in fluid communication with the fuel cell stack for compressing oxygen-containing gas for the fuel cell stack and adapted to be operated by regenerated braking energy from the electric drive system; and a pressure accumulator connected to a compressor outlet for storing additionally-compressed oxygen-containing gas from the compressor.

2. A fuel cell vehicle according claim 1, wherein the fuel cell system further comprises:

a reforming system with a reforming reactor unit and a reactor heater, said reforming system being coupled in fluid communication with the fuel cell stack, wherein the reactor heater is adapted to be operated by regenerated braking energy from the electric drive system, thereby providing additional heating of the reforming reactor unit.

3. A fuel cell vehicle according to claim 1, wherein the fuel cell system further comprises:

a reforming system with a reforming reactor unit, an evaporator, and a heater, wherein the heater is adapted to be operated by regenerated braking energy from the electric drive system, thereby providing additional heating of the evaporator.

4. A fuel cell vehicle, comprising:

an electric drive system having at least one electric motor and being adapted for regenerating braking energy, said electric drive system being connected to a system control;

a fuel cell system for providing electric energy to the drive system comprising a reforming system with a reforming reactor unit, said fuel cell system being connected to the control system by electric connection lines;

a reformate gas compressor that is arranged downstream of and is coupled in fluid communication with the reforming reactor unit and is adapted to be operated by regenerated braking energy; and a reformate gas pressure accumulator being coupled in fluid communication with the reformate gas compressor for the intermediate storage of reformate gas compressed by the reformate gas compressor.

5. A fuel cell vehicle, comprising:

an electric drive system having at least one electric motor and being adapted for regenerating braking energy, said electric drive system being connected to a system control;

fuel cell system for providing electric energy to the drive system comprising a reforming system having a reforming reactor unit and an evaporator connected in front of the reforming reactor unit, said fuel cell system being connected to the control system by electric connection lines;

a vapor accumulator connected to an evaporator outlet, wherein the evaporator is adapted to be operated by regenerated braking energy from the electric drive system, thereby producing excess vapor to be intermediately stored in the vapor accumulator.

6. A fuel cell vehicle, comprising:

an electric drive system having at least one electric motor and being adapted for regenerating braking energy, said electric drive system being connected to a system control;

a fuel cell system comprising a fuel cell stack for providing electric energy to the drive system, said fuel cell system being connected to the control system by electric connection lines; and means for directly utilizing the regenerated braking energy in at least one energy-consuming component of the fuel cell system, wherein said utilizing means is selected from the group consisting of:

a pressure accumulator connected to an air compressor outlet of a compressor coupled in fluid communication with the fuel cell stack;

a reformate gas pressure accumulator for the intermediate storage of reformate gas compressed by a reformate gas compressor, said reformate gas compressor being coupled in fluid communication with a reformation reactor unit; and a vapor accumulator connected to an evaporator outlet of an evaporator coupled in fluid communication with the reformation reactor unit.

7. A fuel cell vehicle according to claim 1, which does not contain a storage battery for regenerated braking energy.

8. A method of operating an energy-consuming component of a fuel cell vehicle, comprising:

directing regenerated braking energy from an electric drive system to an air compressor;

compressing oxygen-containing gas; and intermediately storing the compressed oxygen-containing gas in a pressure accumulator connected to an air compressor outlet.

9. A method according to claim 8, further comprising:

directing regenerated braking energy from the electric drive system to a heater; and heating a reforming reactor unit.

10. A method according to claim 8, further comprising:

directing regenerating braking energy from the electric drive system to a heater; and heating an evaporator.

11. A method for operating an energy-consuming component of a fuel cell vehicle, comprising:

directing regenerated braking energy from an electric drive system to a reformate gas compressor arranged downstream of a reforming reactor unit;

compressing reformate gas; and intermediately storing the compressed reformate gas in a reformate gas pressure accumulator.

12. A method for operating an energy-consuming component of a fuel cell vehicle, comprising:

directing regenerated braking energy from an electric drive system to an evaporator connected in front of a reforming reactor unit; and producing excess vapor in the evaporator; and intermediately storing the excess vapor in a vapor accumulator.

* * * * *